United States Patent
Nguyen

(10) Patent No.: US 11,255,617 B2
(45) Date of Patent: Feb. 22, 2022

(54) HEAT EXCHANGE DEVICE INCLUDING A PROTECTION DEVICE

(71) Applicant: Valeo Systemes Thermiques, le Mesnil-Saint-Denis (FR)

(72) Inventor: Dinh-Luyen Nguyen, le Mesnil Saint Denis (FR)

(73) Assignee: Valeo Systemes Thermiques, Le Mesnil Saint Denis (FR)

(*) Notice: Subject to any disclaimer, the term of this patent is extended or adjusted under 35 U.S.C. 154(b) by 64 days.

(21) Appl. No.: 16/468,913

(22) PCT Filed: Dec. 12, 2017

(86) PCT No.: PCT/FR2017/053525
§ 371 (c)(1),
(2) Date: Jun. 12, 2019

(87) PCT Pub. No.: WO2018/109367
PCT Pub. Date: Jun. 21, 2018

(65) Prior Publication Data
US 2019/0331438 A1 Oct. 31, 2019

(30) Foreign Application Priority Data
Dec. 12, 2016 (FR) .................................... 1662281

(51) Int. Cl.
| F28F 19/00 | (2006.01) |
| B60R 19/52 | (2006.01) |
| F28D 1/04  | (2006.01) |
| F28F 9/02  | (2006.01) |

(52) U.S. Cl.
CPC ............ *F28F 19/002* (2013.01); *B60R 19/52* (2013.01); *F28D 1/0435* (2013.01);
(Continued)

(58) Field of Classification Search
CPC .. B60R 19/52; B60R 2019/525; F28F 19/002; F28F 2265/02; F28F 9/001;
(Continued)

(56) References Cited

U.S. PATENT DOCUMENTS

| 1,571,354 A | * | 2/1926 | Whitacre | ................. B60R 19/52 |
| | | | | 180/68.6 |
| 1,628,131 A | * | 5/1927 | Fageol | ..................... B60R 19/52 |
| | | | | 180/68.6 |

(Continued)

FOREIGN PATENT DOCUMENTS

| EP | 2011976 A1 | 1/2009 |
| EP | 2495521 A1 | 9/2012 |

(Continued)

OTHER PUBLICATIONS

International Search Report and Written Opinion issued in Corresponding PCT Application No. PCT/FR2017/053525, dated Mar. 29, 2018 (19 Pages with English Translation of the International Search Report and Written Opinion).

*Primary Examiner* — Eric S Ruppert
(74) *Attorney, Agent, or Firm* — Osha Bergman Watanabe & Burton LLP

(57) ABSTRACT

The present invention relates to a heat exchange device (10) for a motor vehicle including a heat exchanger (12) with first and second collector plates (26; 28), first and second header boxes (30; 56) attached to the collector plates (26; 28) and a bundle (18; 20) of pipes (22) extending between the first and second collector plates (30; 56). Each of the collector plates (30; 56) forms a groove (54; 72) between the pipes (22) of the pipe bundle (18; 20) and a lateral end (50; 68) of the respective collector plate (30; 56). A perforated protective device (14) for the pipes (22) is attached to the heat exchanger (12) using attachment means (78, 80) bearing (Continued)

Figure 1:
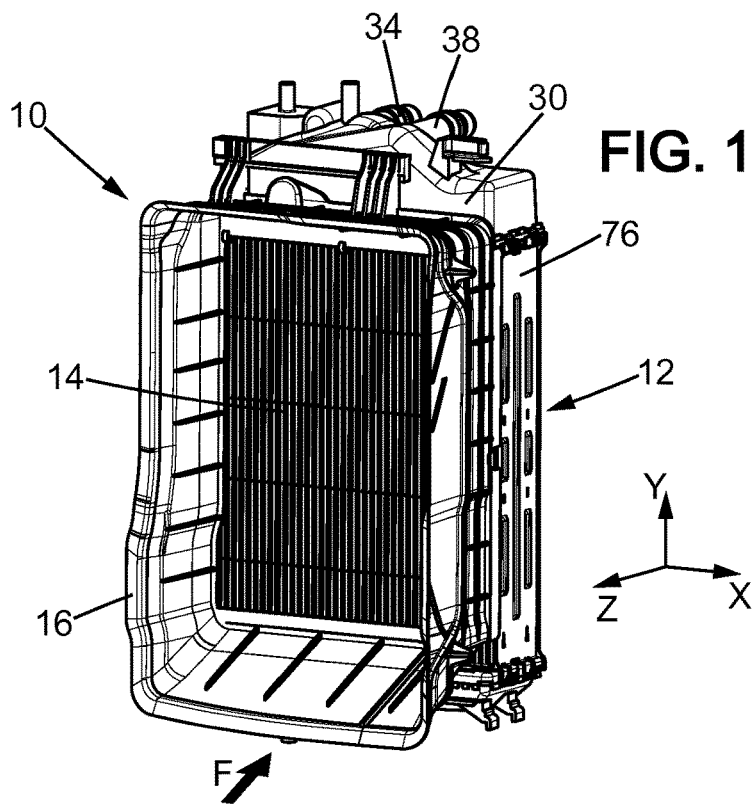

against the inside of the grooves (54, 72) in the first and second collector plates (26; 28).

12 Claims, 9 Drawing Sheets

(52) U.S. Cl.
CPC ...... *F28F 9/0202* (2013.01); *B60R 2019/525* (2013.01); *F28F 2265/02* (2013.01)

(58) Field of Classification Search
CPC .. F28F 9/002; F28F 2275/08; F28F 2275/085; F01P 11/10
See application file for complete search history.

(56) References Cited

U.S. PATENT DOCUMENTS

| | | | |
|---|---|---|---|
| 5,042,575 A | 8/1991 | Lindsay | |
| 6,533,027 B2 * | 3/2003 | Gille | F28D 1/0435 165/140 |
| 6,810,950 B1 | 11/2004 | Manze, III | |
| 2005/0029028 A1 | 2/2005 | Steinmacher | |
| 2007/0080009 A1 | 4/2007 | Kowalski | |
| 2009/0126916 A1 * | 5/2009 | Yoshino | F28F 19/002 165/149 |
| 2012/0222837 A1 * | 9/2012 | Lanfranco | F28F 19/002 165/67 |

FOREIGN PATENT DOCUMENTS

| | | | | |
|---|---|---|---|---|
| FR | 1554049 A | | 1/1969 | |
| FR | 1554050 A | | 1/1969 | |
| JP | 2002098113 A | * | 4/2002 | ............. F28F 9/002 |
| JP | 2011162092 A | | 8/2011 | |
| JP | 2012229907 A | | 11/2012 | |
| JP | 2014173483 A | * | 9/2014 | |
| WO | 9850751 A1 | | 11/1998 | |
| WO | 2016177826 A1 | | 11/2016 | |
| WO | 2016177831 A1 | | 11/2016 | |

* cited by examiner

HEAT EXCHANGE DEVICE INCLUDING A PROTECTION DEVICE

The invention relates to a heat exchange device for a motor vehicle including a heat exchanger and a protection device for the heat exchanger. The invention also relates to an assembly method for such a heat exchange device. The invention relates more specifically to a heat exchange device arranged on the front face of a motor vehicle.

In the automotive field, heat exchangers arranged on the front face can be affected by projected debris, notably stones, which can damage the heat exchanger. Notably, this debris can perforate the pipes of the heat exchanger containing a fluid flow to be cooled by an air flow created by the moving motor vehicle.

In order to protect these heat exchangers, it is known to place a protection device in front of the heat exchangers, according to the normal direction of movement of the motor vehicle, to absorb impacts caused by projected debris. The protection device is notably a grille.

Thus, for example, document US-A-2007/080009 proposes attaching the protection device to the fender of the motor vehicle.

Document US-A-2005/029028 in turn teaches attaching the protection device to a frame arranged upstream of the pipe bundle, with reference to the direction of the air flow passing through the heat exchanger.

Finally, application JP 2012 229 907 describes a heat exchange device including a grille attached to the header boxes of the heat exchanger, arranged on both sides of the pipe bundle or bundles traversed by the fluid to be cooled.

These attachment methods for the protection device are bulky in that they substantially increase the volume occupied by the heat exchange device formed by the heat exchanger and the protection device.

Furthermore, application FR 15 54 049, filed by the present applicant, describes a heat exchange device in which the protection device has attachment peaks extending substantially perpendicular to the grille, the attachment peaks being inserted by force between the fins separating the pipes in the pipe bundle. However, the fins can be deformed, which can adversely affect attachment of the protection device.

Finally, application FR 15 54 050, also filed by the present applicant, describes a heat exchange device provided with a protective grille with hooks. The protective grille is arranged to face the front face of the heat exchanger, such that the hooks overlap the side faces of the heat exchanger and engage with the rear face of said heat exchanger. However, this device is bulkier than the heat exchanger alone.

There is therefore a need for a heat exchange device that does not have at least some of the drawbacks of the devices in the prior art.

For this purpose, the invention proposes a heat exchange device for a motor vehicle including:
 a heat exchanger with
  a first collector plate and a second collector plate extending mainly in a longitudinal direction,
  a first header box attached to the first collector plate and a second header box attached to the second collector plate, and
  at least one pipe bundle extending between the first and second collector plates in a longitudinal direction of the pipes,
  each of the first and second collector plates forming, between the pipes of the pipe bundle and a lateral end of the respective collector plate, a groove extending substantially in the longitudinal direction of the respective collector plate, perpendicular to the longitudinal direction of the pipes, and
 a perforated protective device for the pipes in the pipe bundle, including attachment means to the heat exchanger, the attachment means bearing against the inside of the grooves formed by the first and second collector plates.

Thus, the protection device is attached directly to the heat exchanger. Advantageously, it is thus possible to shape the protection device such that same does not project laterally beyond the heat exchanger, thereby limiting the size of the heat exchange device.

This attachment to the collector plates is therefore robust, in particular if the collector plates are made of metal.

According to the preferred embodiments, the heat exchange device according to the invention has one or more of the following features, taken individually or in combination:
 the attachment means include at least one elastic fitting relief that fits into either the groove of the first collector plate or the groove of the second collector plate, the attachment means preferably including a plurality of such elastic fitting reliefs fitting into either the groove of the first collector plate or the groove of the second collector plate, said elastic fitting reliefs also preferably being evenly distributed,
 the attachment means also include at least one elastic fitting relief that fits into the other of either the groove of the first collector plate or the groove of the second collector plate, the attachment means preferably including a plurality of such elastic fitting reliefs fitting into the other of either the groove of the first collector plate or the groove of the second collector plate, said elastic fitting reliefs also preferably being evenly distributed,
 the attachment means also include at least one bearing relief that fits bearingly into the other of either the groove of the first collector plate or the groove of the second collector plate, the attachment means preferably including a plurality of such bearing reliefs fitting into the other of either the groove of the first collector plate or the groove of the second collector plate, the elastic fitting reliefs also preferably being evenly distributed,
 the protection device has openings, the openings extending parallel to the pipes of the pipe bundle, the openings preferably being offset in relation to the pipes in a direction parallel to the longitudinal direction of the first and/or second collector plate,
 the protection device includes a grille, the grille preferably having bars, the grille preferably having bars extending in a direction parallel to the pipes and/or bars extending perpendicular to the direction of the pipes,
 the grille has as many bars extending parallel to the pipes as there are pipes in the pipe bundle,
 the heat exchange device also includes an attached part extending at least partially about the protection device,
 the attached part is an air guide, notably a convergent air guide,
 the attached part is attached to the first and/or second header box,
 the attached part has elastic fitting reliefs on the first and/or second header box, the first and/or second header box preferably having reliefs that match said elastic fitting relief of the attached part, and
 the protection device and/or the attached part, where applicable, is/are made of plastic, notably of polyamide or polypropylene.

According to another aspect, the invention relates to an assembly method for a heat exchange device as described above in all related combinations, including a step in which the protection device is attached inside the grooves formed by the first and second collector plates.

According to a first variant, the attachment step of the protection device includes a step involving elastically fitting the elastic fitting reliefs into the groove of the first collector plate and into the groove of the second collector plate, preferably substantially simultaneously.

According to a second variant, the attachment step of the protection device involves a first step in which the bearing reliefs are inserted into the groove of either the first collector plate or the second collector plate, then a step in which the protection device is pivoted, and finally a step in which the elastic fitting reliefs are fitted into the groove of the other of either the first collector plate or the second collector plate.

Preferably, the assembly method also includes a step in which an attached part, notably an air guide, is attached to the header boxes, the attached part preferably being attached at least in part by elastic fitting to one of the header boxes.

Figure 2:
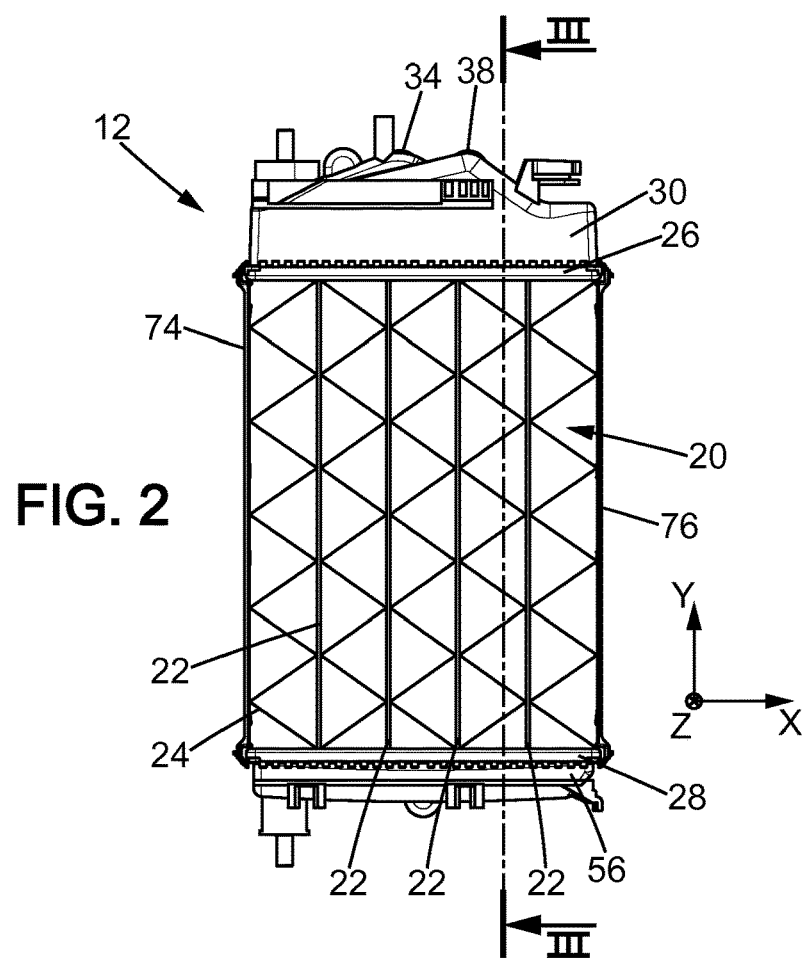
Figure 3:
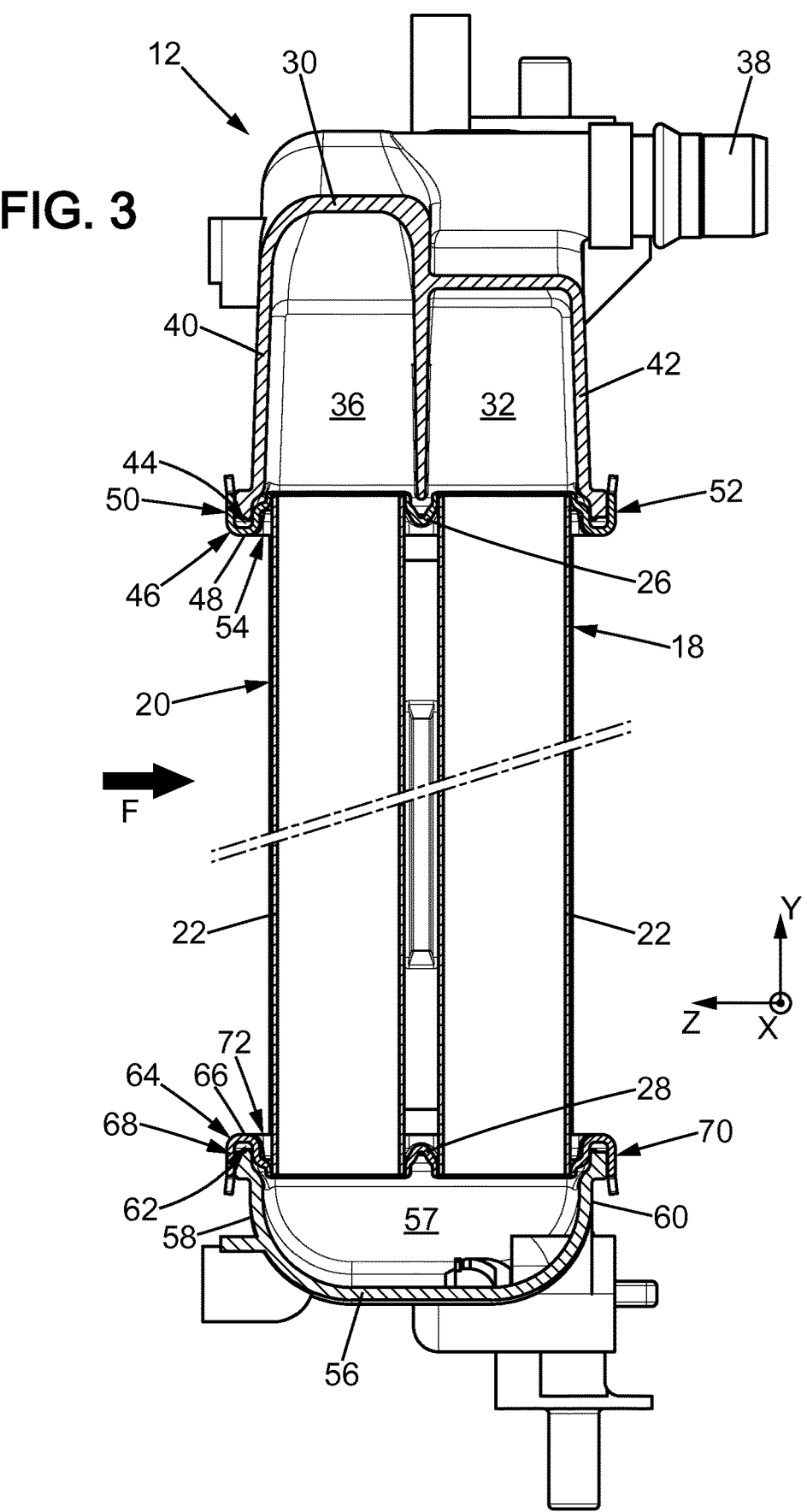
Figure 4:
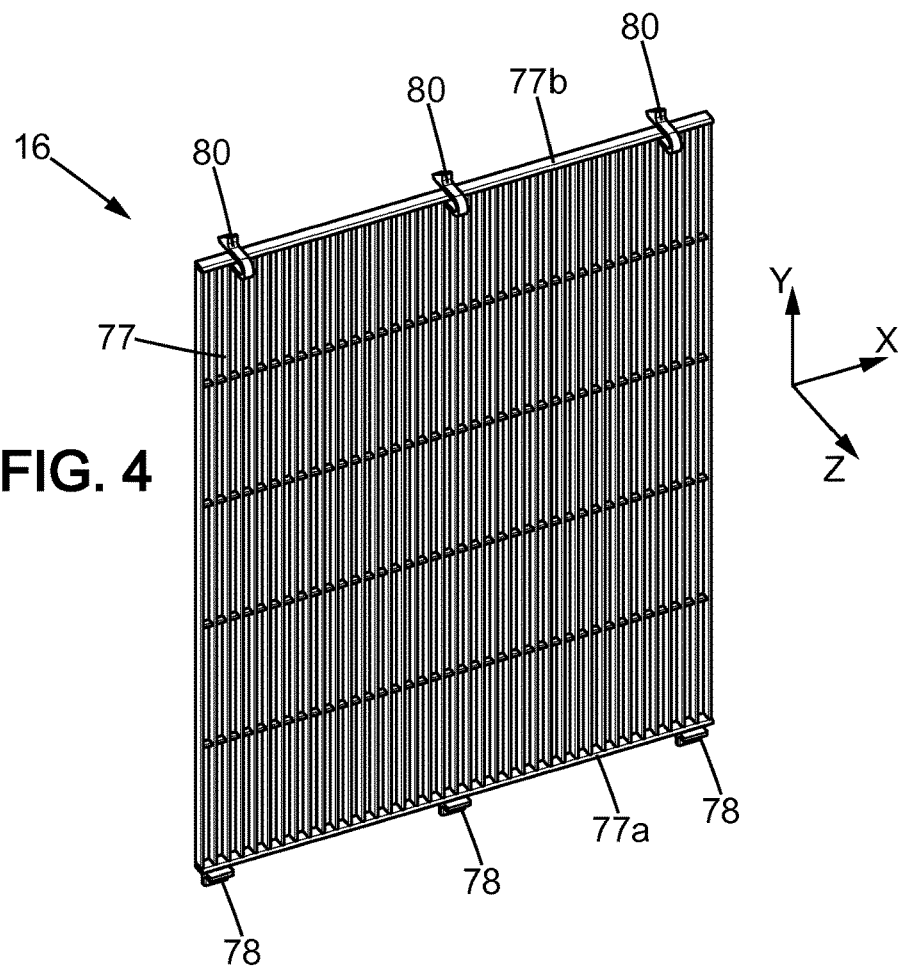
Figure 5A:
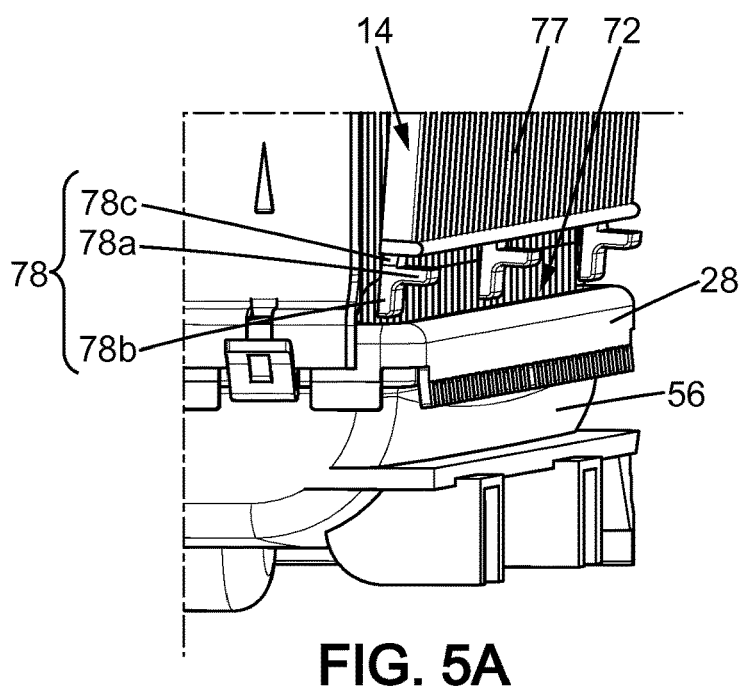
Figure 5B:
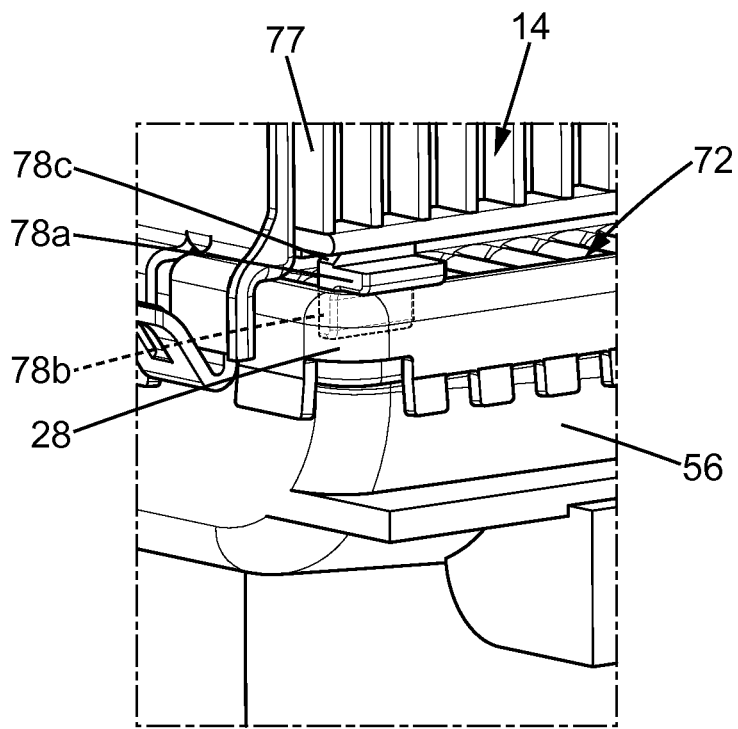
Figure 5C:
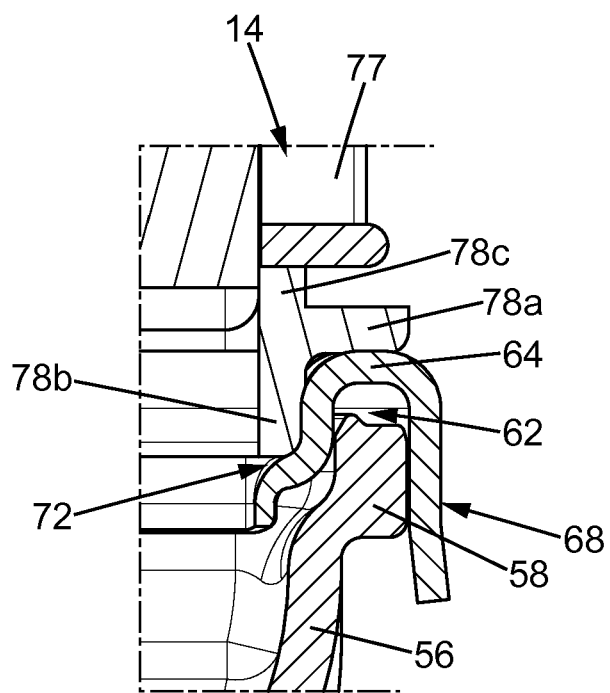
Figure 5D:
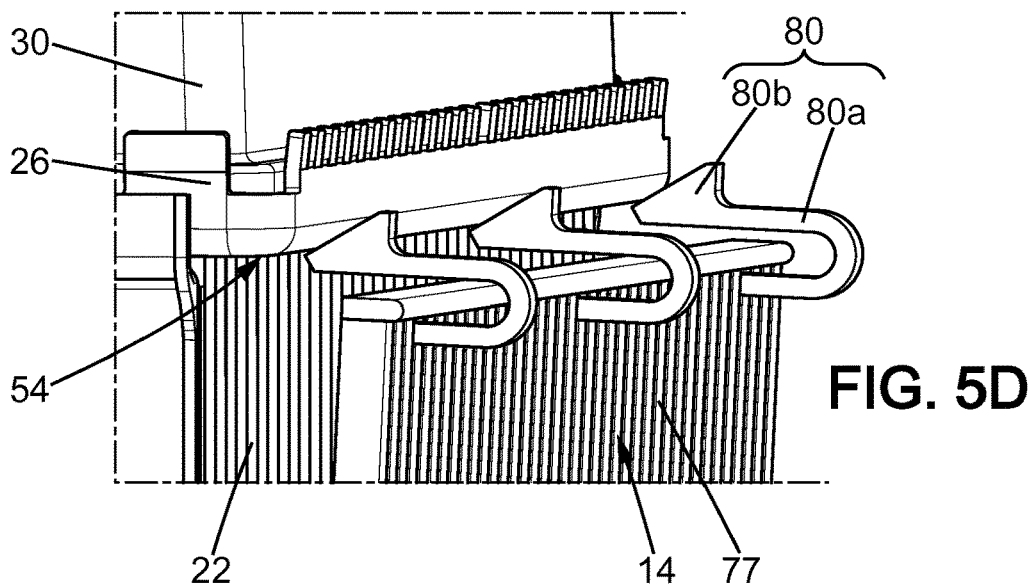
Figure 5E:
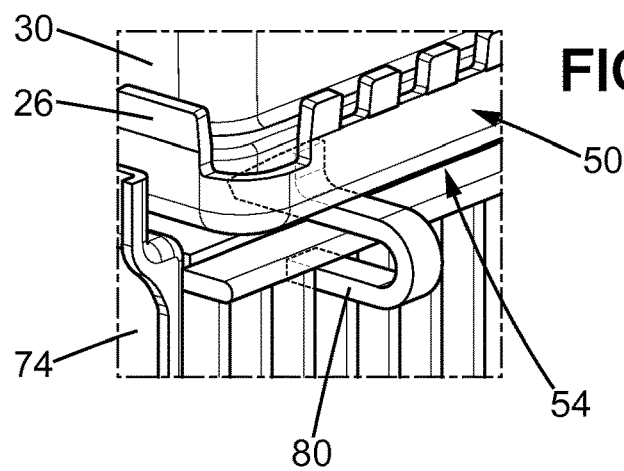
Figure 5F:
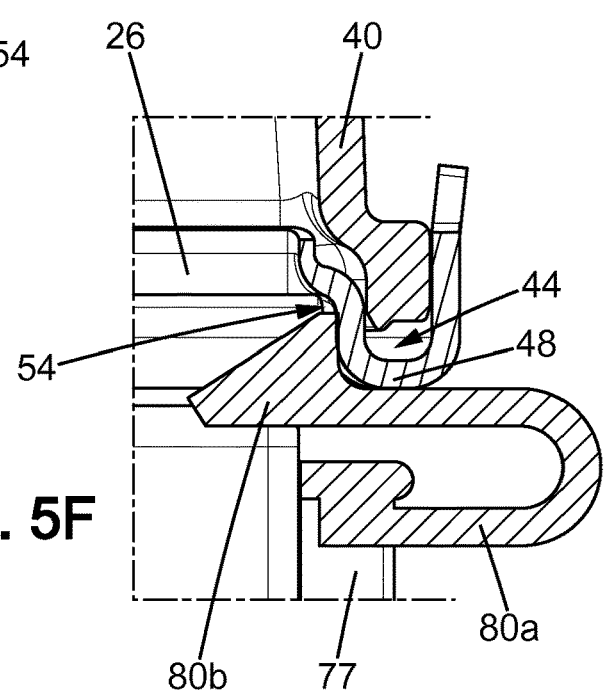
Figure 6:
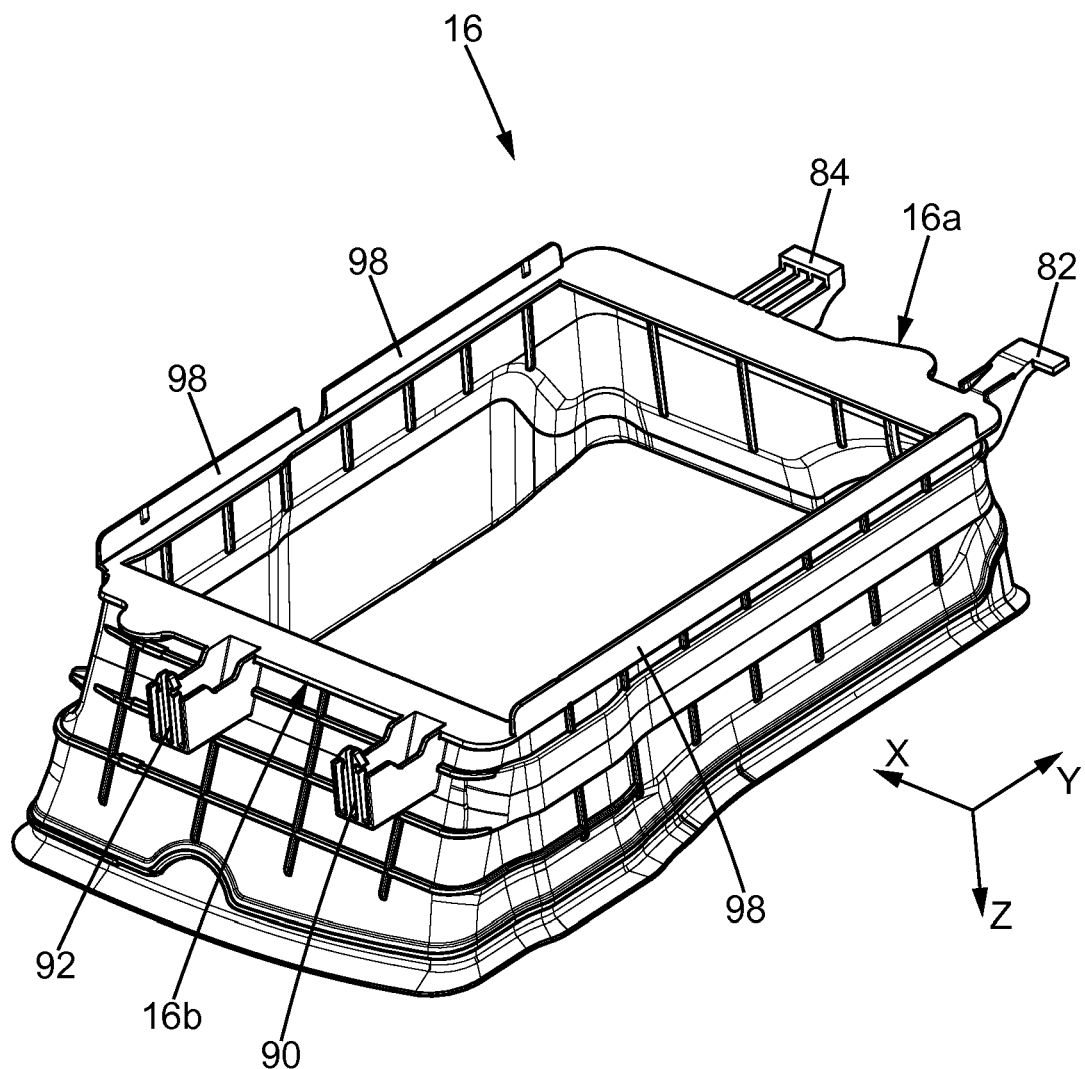
Figure 7A:
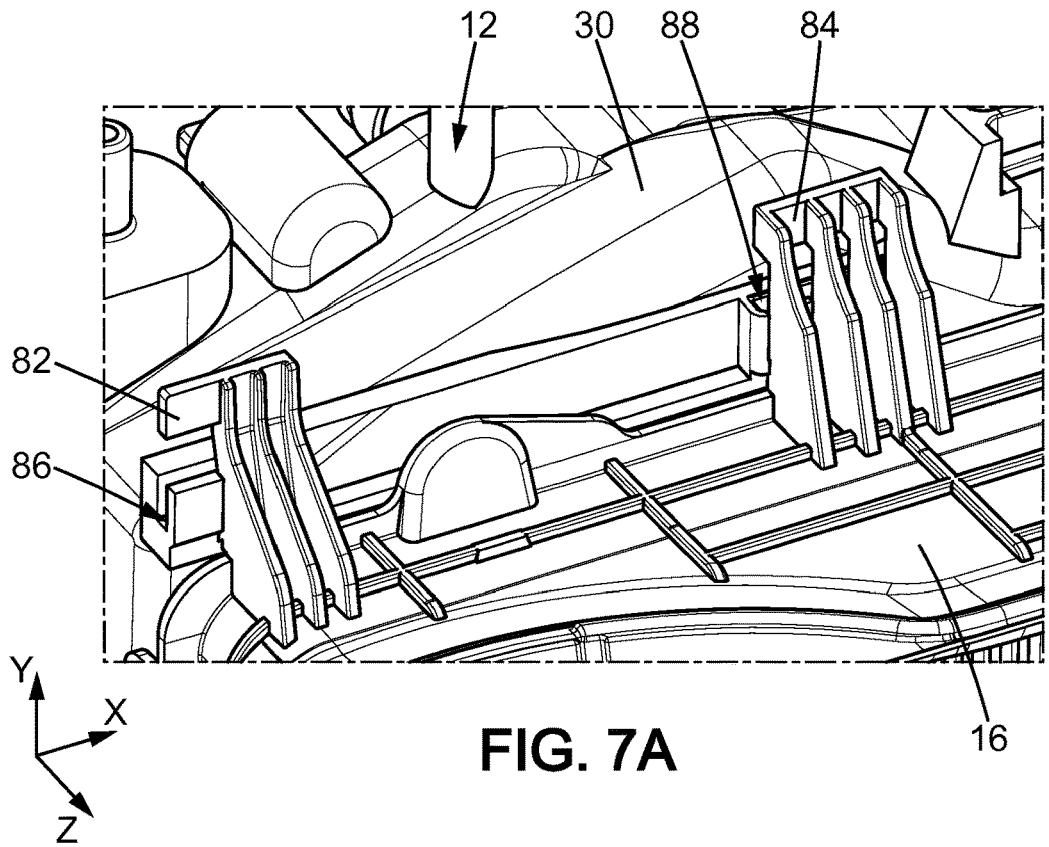
Figure 7B:
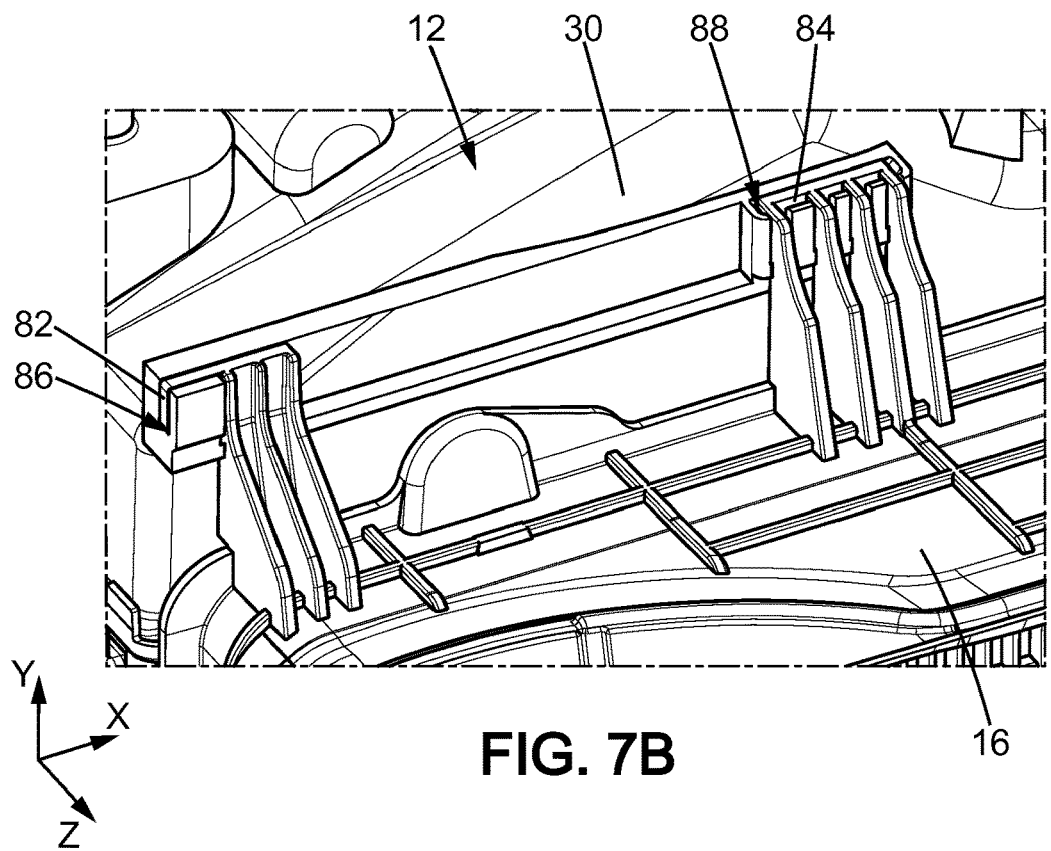
Figure 7C:
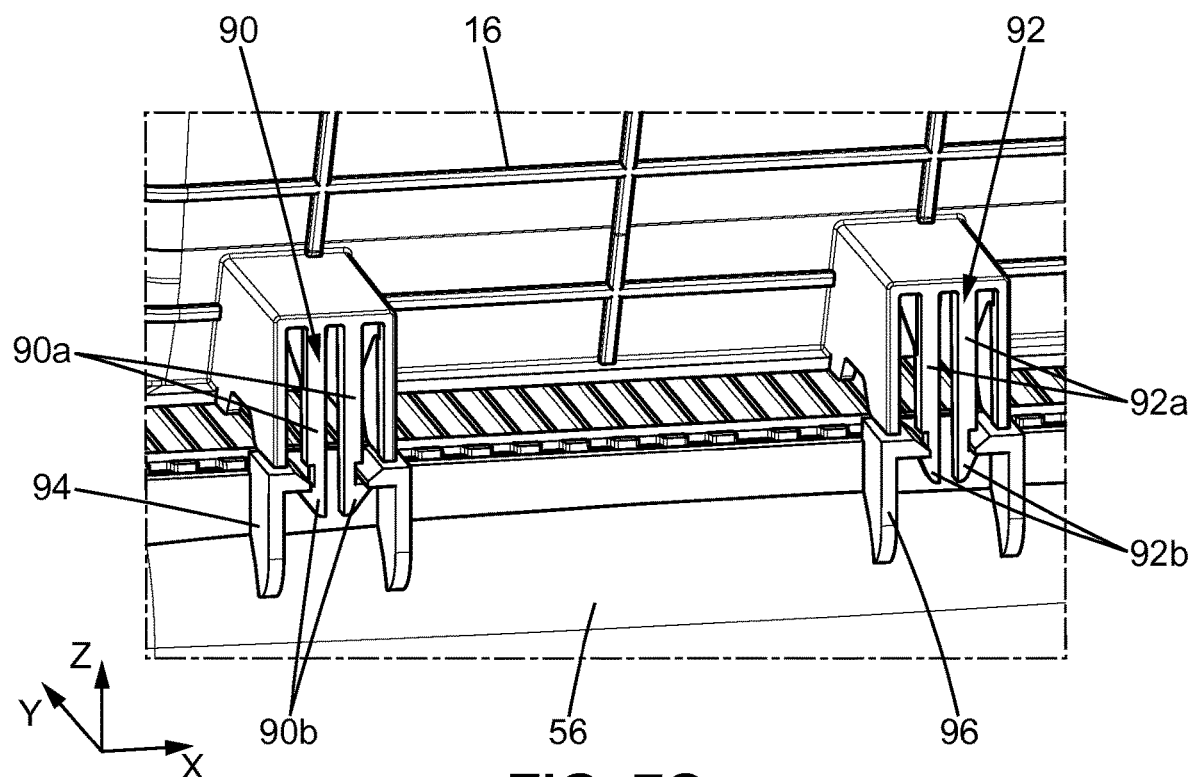
Figure 7D:
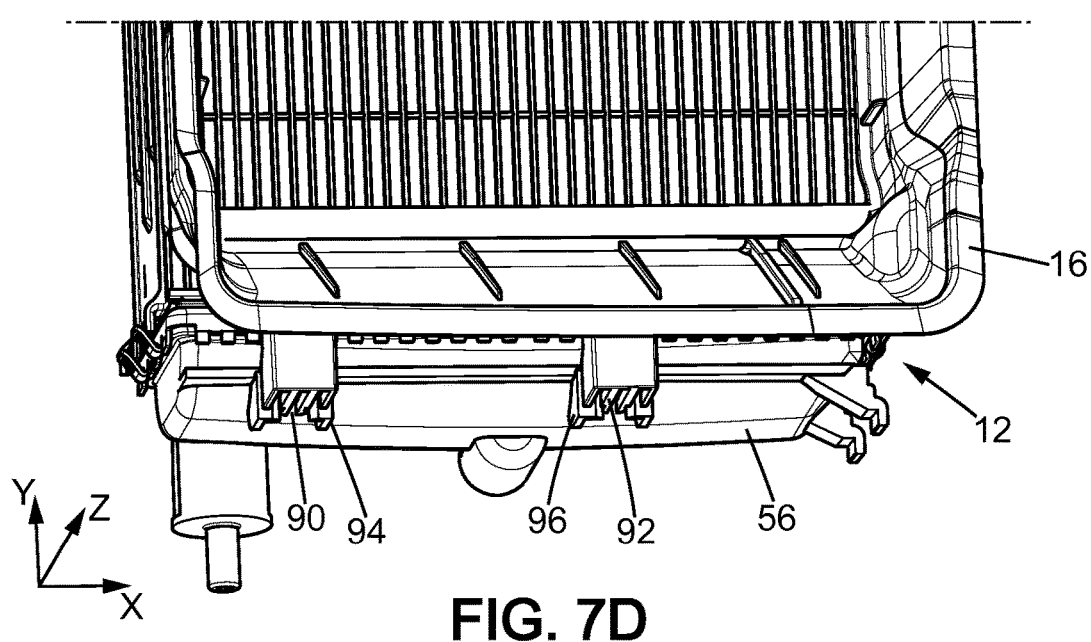
Figure 8:
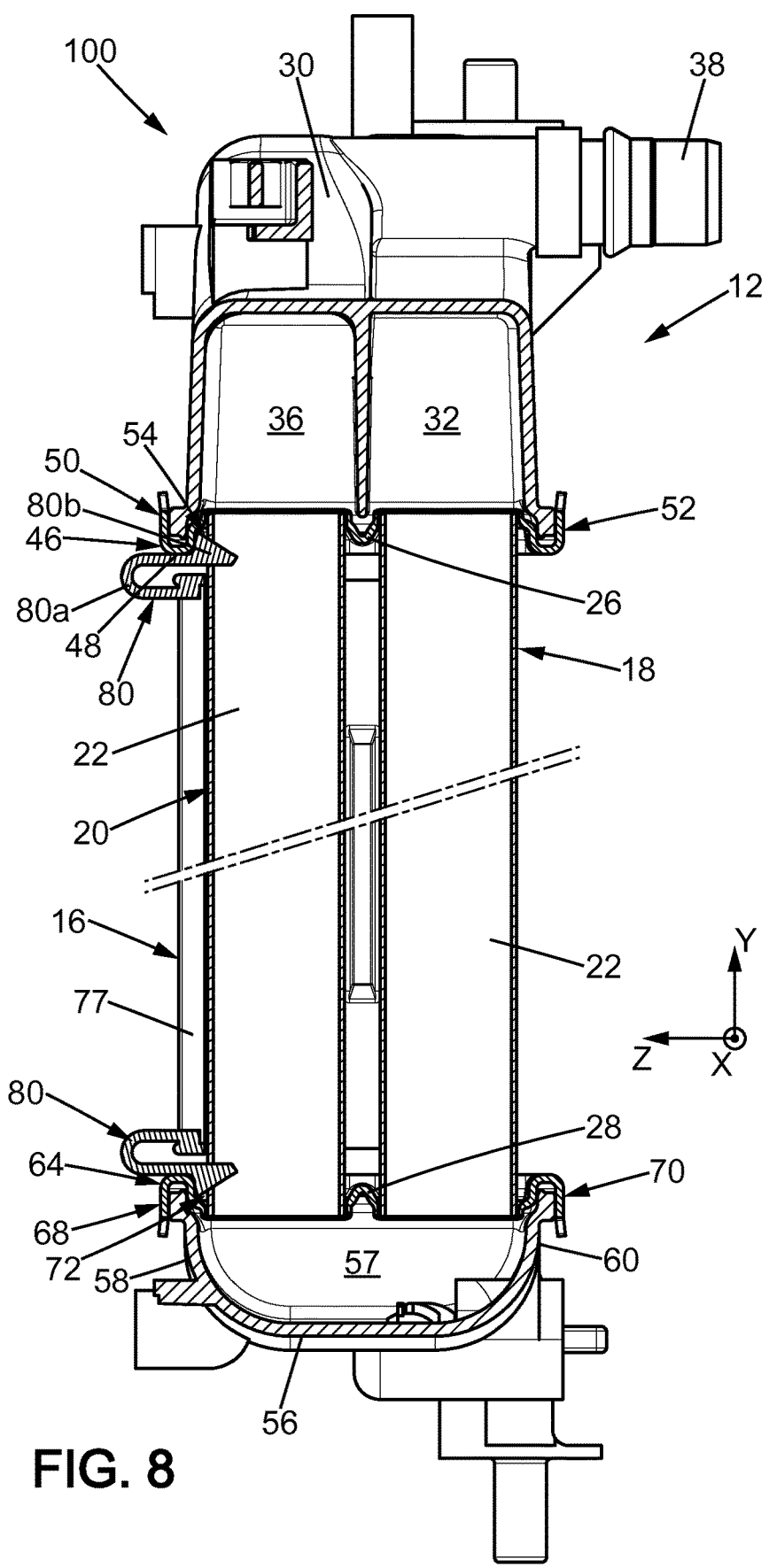

Other features and advantages of the invention will become more clearly apparent on reading the description below, given by way of non-limiting example and the attached drawings, in which:

FIG. 1 is a perspective view of a first example heat exchange device,

FIG. 2 is a schematic front view of a heat exchanger that can be used in the heat exchange device in FIG. 1, FIG. 3 is a schematic cross section along the plane III of the heat exchanger in FIG. 2, FIG. 4 is a perspective view of a protection device that can be used in the heat exchange device in FIG. 1, FIGS. 5A to 5F show the steps for assembling the protection device in FIG. 4 on the heat exchanger in FIG. 2, FIG. 6 is a perspective view of a convergent air guide that can be used in the heat exchange device in FIG. 1, FIGS. 7A to 7D are schematic views of details of the attachment of the air guide in FIG. 6 to the heat exchanger in FIG. 2 provided with a protection device, and FIG. 8 is a schematic longitudinal cross section of a second example heat exchange device.

In the figures, identical elements or elements having identical functions are identified using the same reference numbers. These elements are not described in each example. Indeed, for the sake of conciseness, only the differences between the different examples are described in detail.

FIG. 1 shows a first example heat exchange device 10. This comprises essentially a heat exchanger 12, a protection device 14 for the heat exchanger 12, and an attached part 16 on the heat exchanger 12.

The heat exchanger 12 is shown more clearly in FIGS. 2 and 3. The heat exchanger includes two bundles 18, 20 of pipes 22 that are designed to be traversed by a fluid to be cooled, the pipes 22 in a single bundle 18, 20 being separated from one another by fins 24.

The first pipe bundle 18 is arranged parallel to the second pipe bundle 20 and offset in the direction of the air flow F created by the vehicle when in motion. The pipes 22 of the two bundles 18, 20 extend mainly in a common longitudinal direction Y, between a first collector plate 26 and a second collector plate 28. Each collector plate 26, 28 extends mainly in a longitudinal direction X. The collector plates 26, 28 are in this case parallel, perpendicular to the longitudinal direction Y of the pipes.

A first header box 30 is attached to the first collector plate 26. In this case, this header box 30 is a cover, preferably made of plastic. In this case, this first header box 30 delimits a first volume 32 in fluid communication on one side with a fluid inlet 34 of the heat exchanger 12 formed by the first header box 30, and on the other side with the first pipe bundle 18. The first pipe bundle 18 is advantageously the pipe bundle intended to come into contact with the air flow F, once said air flow has passed through the second pipe bundle 20. The first header box 30 also forms a second volume 36 that is in fluid communication on one side with a fluid outlet 38 formed by the first header box 30, and on the other side with the second pipe bundle 20.

As shown in particular in FIG. 3, the side walls 40, 42 of the first header box 30 fit into a slot 44 of the first collector plate 26 formed by a fold or embossing 46 of the first collector plate 26. This first slot 44 extends about substantially all of the perimeter of the first collector plate 26. The slot 44 of the first collector plate 26 can be fitted with a seal interposed between the side walls 40, 42 of the first header box 30 and the first collector plate 26 to limit or prevent leaks of liquid from the volumes 32, 36 formed inside the first header box 30.

On the side opposite the side walls 40, 42 of the first header box 30, the embossing 46 of the first collector plate 26 forms a projecting rib 48 extending between the pipes 22 of the first and second bundles 18, 20 and a lateral end 50, 52 of the first collector plate 26. This projecting rib 48 notably defines a groove 54, at the lateral end 50 of the first collector plate 26, which is designed to be oriented towards the front of the vehicle (i.e. in this case the lateral end 50 of the first collector plate 26 that is closest to the second pipe bundle 20), said groove 54 extending between the projecting rib 48 and the pipes 22 of the second pipe bundle 20. This groove 54 extends essentially in the longitudinal direction X of the first collector plate 26 and therefore perpendicular to the pipes 22 of the second pipe bundle 20.

Similarly, a second header box 56 is attached to the second collector plate 28. This second header box in this case is a cover, preferably made of plastic. The second header box 28 in this case defines a volume 57 in fluid communication with the outlet of the pipes 22 of the first pipe bundle 18 on one side and with the inlet of the pipes 22 of the second pipe bundle 20 elsewhere.

The side walls 58, 60 of the second header box 56 fit into a slot 62 in the second collector plate 28 formed by a fold or an embossing 64 of the second collector plate 28. This second slot 62 extends about substantially all of the perimeter of the second collector plate 28. The slot 62 in the second collector plate 28 can receive a seal interposed between the side walls 58, 60 of the second header box 56 and the second collector plate 28, to limit or prevent liquid leaking out of the volume 57 defined inside the second header box 56.

On the side opposite the side walls 58, 60 of the second header box 56, the embossing 64 of the second collector plate 28 forms a projecting rib 66 extending between the pipes 22 of the first and second bundles 18, 20 and a lateral end 68, 70 of the second collector plate 28. This projecting rib 66 notably defines a groove 72 at the lateral end 68 of the second collector plate 28, which is designed to be oriented towards the front of the vehicle (i.e. in this case the lateral end 68 of the second collector plate 28 that is closest to the second pipe bundle 20), said groove 72 extending between the projecting rib 66 and the pipes 22 of the second pipe bundle 20. This groove 72 extends essentially in the longitudinal direction X of the second collector plate 28 and therefore perpendicular to the pipes 22 of the second pipe bundle 20.

Lastly, the heat exchanger 12 has two side panels 74, 76 extending mainly in the longitudinal direction Y of the pipes 22 of the two pipe bundles 18, 20.

Furthermore, the protection device 14 of the heat exchange device 10 is shown in greater detail in FIG. 4. In this case, this protection device 14 is a flat perforated surface 77 with attachment means comprising bearing reliefs 78 at a first longitudinal end 77a of the flat perforated surface 77, and elastic fitting reliefs 80 at a second longitudinal end 77b of the perforated surface 77 opposite the first longitudinal end 77a.

In this case, the flat perforated surface is a grille 77. In the example shown, all of the bars of the grille 77 are parallel and extend in a corresponding longitudinal direction Y, once the grille 77 has been assembled on the heat exchanger 12, in the longitudinal direction Y of the pipes 22 of the first and second pipe bundles 18, 20. Advantageously, the grille 77 has as many bars as the second pipe bundle 20 has pipes 18. Thus, advantageously, a bar of the grille 77 can be arranged to face a pipe 22 of the second pipe bundle 20, thereby optimizing the protection provided by the protection device 14. The grille 77 can in particular be made of plastic, for example polyamide or polypropylene. Thus, the grille 77 is easy to make, for example by molding. Furthermore, the weight of the protection device 14 is thus limited.

Naturally, the bars can be oriented differently, notably perpendicular to the longitudinal direction of the pipes 22. Alternatively, the grille can have bars that are not parallel. Notably, the grille can have perpendicular bars, a first group of bars extending for example parallel to the longitudinal direction Y of the pipes 22, while a second group of bars extends perpendicular to the first group of bars, i.e. parallel to the longitudinal direction X of the first and second collector plates 26, 28, once the grille 77 has been assembled on the heat exchanger 12.

In this case there are three bearing reliefs 78, although this number is not limiting. The bearing reliefs 78 are advantageously evenly distributed along the length of the first longitudinal end 77a of the grille 77. As shown notably in FIG. 5a, the bearing reliefs 78 are substantially "L" shaped, with two perpendicular branches 78a, 78b, and an appendage 78c linking the "L" to the grille 77.

In this case there are also three elastic fitting (or clipping) reliefs 80 although this number is not limiting. The elastic fitting reliefs 80 are evenly distributed along the length of the second longitudinal end 77b of the grille 77.

As shown notably in FIG. 5D, the elastic fitting reliefs 80 are formed by U-shaped tabs 80a extending from a face of the protection device 14 opposite the face designed to face the pipes 22 of the heat exchanger 12. The "U" shape of the tabs 80a enables elastic deformation of the elastic fitting reliefs 80. However, the tabs 80a project in part beyond the face of the protection device 14 designed to face the pipes 22 of the heat exchanger 12. Notably, the free end 80b of the elastic fitting reliefs 80 project beyond this face of the protection device 14 designed to face the pipes 22 of the heat exchanger 12. In this case, the free end 80b is shaped like a crooked finger.

The protection device 14 can be attached to the heat exchanger 12, in the manner shown in FIGS. 5A to 5F.

Firstly and as shown in FIG. 5A, the bearing reliefs 78 are inserted into the groove 72 formed by the second collector plate 28. More specifically and as shown in FIGS. 5B and 5C, a branch 78a of the "L" of the bearing reliefs 78 bears against the rib 66 of the second collector plate 28. Thus, the protection device butts against the rib 66 of the second collector plate 28 in the longitudinal direction Y of the pipes, in a first direction. In this position, the second branch 78b of the "L" of the bearing reliefs 78 is inserted into the groove 72 of the second collector plate 28. Preferably, the second branch 78b of the "L" of the bearing reliefs 78 is in contact with the rib 66 defining the groove 72, such that the protection device 14 butts against the rib 66 of the second collector plate 28, also in a direction Z normal to the directions X of the collector plates and Y of the pipes, in one direction.

As shown in FIG. 5D, the protection device 14 is then pivoted about an axis substantially parallel to the longitudinal direction X of the second collector plate 28, holding the bearing reliefs 78 against the rib 66 of the second collector plate 28. The crooked fingers 80b of the elastic fitting reliefs 80 are then inserted by force into the groove 54 of the first collector plate 26. This forced insertion is achieved with the elastic deformation of the U-shaped tabs 80a, until the position shown in FIGS. 5E and 5F is reached. In these figures, the crooked fingers 80b of the elastic fitting reliefs 80 are received bearingly in the groove 54 of the first collector plate 26, butting against the rib 48 formed by the first collector plate 26. The crooked fingers 80b are held in this position by the elastic force applied by the U-shaped tabs 80a. This elastic force of the U-shaped tabs 80a also presses the bearing reliefs 78 against the rib 64 of the second collector plate 28, notably in the groove 72 of the second collector plate 28.

It should be noted that, advantageously, the second header box 56 is positioned beneath the first header box 30, once the heat exchange device 10 has been assembled in the motor vehicle. Thus, the bearing reliefs 78 are also pressed against the rib 64 of the second collector plate 28 by the weight of the protection device 14.

As described above, the protection device 14 is attached directly to the collector plates 26, 28 of the heat exchanger 12. The protection device 14 can thus be shaped so as not to project laterally in relation to the heat exchanger 12. Notably, the length of the grille 77 or the protection device 14, as measured in the longitudinal direction X of the pipes 22, is substantially equal to the distance between the collector plates 26, 28.

Since the protection device 14 does not project laterally in relation to the heat exchanger 12, an attached part 16 can be attached to the heat exchanger 12, notably "above" the protection device 14, i.e. such that the protection device 14 is interposed between the heat exchanger 12 and the attached part 16. The attached part 16 can then extend at least partially about the protection device 14.

In the example shown, notably in FIG. 6, the attached part 16 is an air guide, in this case a convergent air guide (hereinafter referred to as "convergent nozzle 16"). The convergent nozzle 16 is a funnel structure designed to increase the air flow through the pipe bundle 18, 20. The convergent nozzle 16 is for example made of plastic, notably polyamide or polypropylene.

In this case, the convergent nozzle 16 has a first longitudinal end 16a, two tabs 82, 84 designed to be received slidingly in the direction X in the matching seats 86, 88 formed on the first header box 26. Each of the seats 86, 88 is provided with a stop surface in the insertion direction of the tabs 82, 84. Advantageously, this insertion direction is the direction of the weight of the convergent nozzle 16, once the heat exchange device 10 has been assembled in the motor vehicle, such that this weight of the convergent nozzle 16 is borne by the stop on the seats 86, 88.

At the second longitudinal end 16b of the convergent nozzle 16, the convergent nozzle has two elastic fitting reliefs 90, 92 designed to cooperate with matching reliefs 94, 96 formed on the second header box 56. In this case, each elastic fitting relief 90, 92 is shaped like two parallel symmetrical harpoons, the shaft 90a, 92a of each harpoon 90, 92 being flexible enough to enable the hooks 90b, 92b at the ends to move towards one another by elastic deformation of said shafts 90a, 92a.

As shown, the convergent nozzle 16 also has side edges 98 folded towards the protection device 14 and designed to cooperate with the protection device 14 to limit the relative movements of the convergent nozzle 16 in relation to the protection device 14. In this case, the folded side edges 98 cooperate with the longitudinal edges of the grille 77.

The convergent nozzle 16 can be attached to the heat exchange device 12, as shown in FIGS. 7A to 7D.

Firstly and as shown in FIGS. 7A and 7B, the tabs 82, 84 of the convergent nozzle are inserted into the matching seats 86, 88 of the first header box 30 in the insertion direction. The tabs 86, 88 are inserted until said tabs 86, 88 butt against the stops of the matching seats 86, 88 in the insertion direction.

Once the tabs 82, 84 have been inserted, the elastic fitting reliefs 90, 92 of the convergent nozzle 16 are substantially opposite the matching reliefs 94, 96 of the second header box 56. Pressure is then exerted on the second longitudinal end 16b of the convergent nozzle 16 to fit the elastic fitting reliefs 90, 92 of the convergent nozzle into the matching reliefs 94, 96 of the second header box 56. It should be noted here that the pressure on the second end 16b of the convergent nozzle is exerted in a direction Z normal to the plane of the grille 77. Indeed, attachment using the elastic fitting reliefs 90, 92 is essentially intended to keep the convergent nozzle 16 close to or in contact with the grille 77. The position of the convergent nozzle 16 opposite the grille 77 is essentially ensured by the tabs 82, 84 being stopped in the matching seats 86, 88 of the first header box 30.

FIG. 8 shows a second example heat exchange device 100. This heat exchange device 100 essentially differs from the first example 10 in that the protection device 14 does not have bearing reliefs 78. Each of the longitudinal ends 77a, 77b of the grille 77 has elastic fitting reliefs 80 similar to those in the first example 10.

In this case, attachment of the protection device 14 includes a step that involves elastically fitting the elastic fitting reliefs 80 into the groove 54 of the first collector plate 26 and into the groove 72 of the second collector plate 28. The elastic fitting reliefs 80 can be inserted into the grooves 54, 72 of the first and second collector plates 26, 28 substantially simultaneously. In this case, substantially simultaneously means that insertion is carried out at the same time, for example by a movement of the protection device 14 towards the heat exchanger 12 in a direction Z substantially normal to a plane defined by the longitudinal directions X, Y of the collector plates 26, 28 and of the pipes 22.

The invention is not limited to the embodiments described above. Indeed, the invention covers numerous variants accessible to the person skilled in the art.

Notably, assembly of the protection device and/or of the attached part can be carried out symmetrically by inverting the roles of the first and second collector plates. Furthermore, the attached part can be attached to the heat exchanger by elastic fitting only. To do so, the tabs in the example described need simply be replaced by elastic fitting reliefs.

This attached part need not be an air guide, but can for example be a frame or supporting element, in particular made of plastic, to hold a component or a heat exchanger.

Equally, in the example described, the protection device has a grille. In a variant, the protection device can be made in a manner accessible to the person skilled in the art, provided that same has openings enabling at least part of the air flow F created by the movement of the vehicle to pass through. Preferably, the openings in the protection device extend parallel to the pipes, the openings also preferably being offset in relation to the pipes in a direction parallel to the longitudinal direction of the first and/or second collector plate, Finally, in the examples described, the heat exchanger is a heat exchanger with two methodical passes. The heat exchanger therefore has two coplanar pipe bundles. Alternatively, the heat exchanger can include just one pipe bundle or more than two pipe bundles.

The invention claimed is:

1. A heat exchange device for a motor vehicle including:
    a heat exchanger comprising:
        a first collector plate and a second collector plate extending mainly in a longitudinal direction,
        a first header box attached to the first collector plate and a second header box attached to the second collector plate, and
        at least one bundle of pipes extending between the first and second collector plates in a longitudinal direction of the pipes,
        each of the first and second collector plates forming a groove between the pipes of the pipe bundle and a lateral end of the respective collector plate said groove extending substantially in the longitudinal direction of the respective collector plate, perpendicular to the longitudinal direction of the pipes, and
    a perforated protective device for the pipes in the pipe bundle, including attachment means to the heat exchanger, the attachment means bearing against the inside of the grooves formed by the first and second collector plates,
    wherein the attachment means comprise a plurality of bearing reliefs, the bearing reliefs being L-shaped branches, and a plurality of elastic fitting reliefs, the elastic fitting reliefs being U-shaped tabs,
    the bearing reliefs being fitted into the groove of one of the first collector plate or the second collector plate, and
    wherein the perforated protective device is configured to be pivoted so that the elastic fitting reliefs are fitted into the other groove different from the groove in which the bearing reliefs are fitted.

2. The heat exchange device as claimed in claim 1, wherein the elastic fitting reliefs are evenly distributed.

3. The heat exchange device as claimed in claim 1, wherein the perforated protective device has openings, the openings extending parallel to the pipes of the pipe bundle, the openings being offset in relation to the pipes in a direction parallel to the longitudinal direction of the first and/or second collector plate.

4. The heat exchange device as claimed in claim 1, wherein the perforated protective device includes a grille, the grille having bars extending in a direction parallel to the pipes and/or bars extending perpendicular to the direction of the pipes.

5. The heat exchange device as claimed in claim 4, wherein the grille has as many bars extending parallel to the pipes as there are pipes in the pipe bundle.

6. The heat exchange device as claimed in claim 1, further comprising an attached part extending at least partially about the perforated protective device.

7. The heat exchange device as claimed in claim 6, wherein the attached part is a convergent air guide.

8. The heat exchange device as claimed in claim 6, wherein the attached part is attached to the first and/or second header box.

9. The heat exchange device as claimed in claim 8, wherein the attached part has elastic fitting reliefs attached to the first and/or second header box, the first and/or second header box-having reliefs that match said elastic fitting reliefs of the attached part.

10. The heat exchange device as claimed in claim 1, in which the perforated protective device and/or an attached part is/are made of polyamide or polypropylene.

11. An assembly method for a heat exchange device as claimed in claim 1, comprising attaching the perforated protective device to the inside of the grooves formed by the first and second collector plates.

12. The assembly method as claimed in claim 11, further comprising attaching an air guide, to the header boxes, the air guide being attached at least in part by elastic fitting to one of the header boxes.

\* \* \* \* \*